3,537,815
PREPARATION OF ALKALI METAL SILICATES
Oliver W. Burke, Jr., P.O. Box 1266,
Fort Lauderdale, Fla. 33061
Filed Mar. 9, 1967, Ser. No. 621,970
Int. Cl. C01b *33/32, 33/20*
U.S. Cl. 23—110                                   24 Claims

ABSTRACT OF THE DISCLOSURE

Known operation of sodium silicate furnaces has been limited to about 2300–2600° F. by the volatility of the alkali, these temperatures necessitating prolonged treatment in the furnace; alkali attack has required periodic replacement of furnace linings; and as alkali, soda ash has been preferred to caustic soda as the latter gives off water in the furnace. Herein sodium silicate is produced more rapidly, e.g. at higher temperatures in the range of 3100–3900° F., by a preliminary depression of the volatility of the alkali; the said reaction is preferably conducted in particulate masses essentially out of contact with the furnace lining; and the high temperature reaction is preferably conducted in a modification of the type of furnace heretofore used to produce carbon black.

BACKGROUND OF THE INVENTION

Field of the invention

The field to which the invention pertains is the preparation of sodium silicate.

Description of the prior art

In the commercial manufacture of alkali metal silicate, a mixture of sand and an alkali metal base is heated in bulk for a prolonged period in a sodium silicate furnace to fushion temperatures of about 2300–2600° F. Thereafter, as fused glass is drawn from the molten body, it is replaced by adding alkali metal base and sand to the fusing pool. To produce a silicate solution the glass, after cooling, is dissolved in water by various methods.

SUMMARY OF THE INVENTION

The invention provides, in the production of sodium silicate by the reaction of sodium alkali and silica, an improvement which consists in:
(a) forming a mixture of particulate silica material 100 parts as $SiO_2$, sodium silicate 10 to 60 parts as $Na_2O(SiO_2)_{2.5-4.0}$; and sodium alkali in such proportion as to produce alkali carrying silica particles in which the molar ratio of the total alkali as $Na_2O$ to the total silica as $SiO_2$ is 1:2.5 to 1:4;
(b) carrying the particles prepared by step (a) in a gaseous medium through a refractory lined direct flame furnace heated to a temperature to form further sodium silicate while essentially keeping the particles out of contact with the furnace lining during their passage therethrough, and
(c) recovering sodium silicate produced in step (b).

In accordance with the present invention, silica in particulate form is coated with alkali in combination with alkali silicate, and the combination of reactants in particulate form is treated to produce further sodium silicate for a short period of time at more elevated temperatures, preferably of the order of 3100–3900° F. or somewhat higher; preferably essentially continuously, and preferably essentially out of contact with the furnace walls, treatment in a modified carbon black furnace being preferred and treatment in a modized carbon black furnace of the helical flame or rotating vortex type being most preferred.

The invention contemplates that the alkali portion of the composition under consideration may be any of the alkali metals including lithium, sodium, potassium, cesium, or rubidium or combinations thereof with each other or with minor proportions of other metal salts, though of course, the recognized commercial compounds are usually sodium silicates. Hereinafter reference will be made only to sodium compounds, it being understood that all the foregoing are included.

Objects of embodiments of the invention, severally and interdependently, include the provision of a process enabling operation of the sodium silicate forming reaction at temperatures above the boiling point of sodium hydroxide, 2534° F., without significant lose of such reactant; the provision of a process which avoids the prolonged thermal treatments required by the prior art; the provision of a process which minimizes alkali attack on the furnace linings employed; and provision of a process in which essentially sodium hydroxide may be effectively employed as the caustic alkali. Other objects and advantages of the invention will be made apparent to those skilled in the art by reference to the following detailed description of preferred embodiments of the invention taken in connection with the accompanying drawing forming a part thereof.

BRIEF DESCRIPTION OF THE DRAWING

In the accompanying drawing: the single figure, hereinafter called the single figure, is a flow sheet illustrating the sequence of steps and flow of materials in typical embodiments of process according to the invention.

DESCRIPTION OF PREFERRED EMBODIMENTS

In the preferred embodiments illustrated in the single figure in the drawing, the production of sodium silicate is effected by the reaction in particulate masses of silica with sodium alkali carried thereon with or without the addition of catalytic salts to facilitate the reaction. The particulate silica material 1 may be any suitable silica bearing material in particulate form, e.g. silica flour, quartz sand, or the like, and when reference is made to sand hereinafter it will be understood that other silica bearing materials are included. The sodium alkali 2 is selected from the class consisting of sodium hydroxide, sodium carbonate, sodium bicarbonate, sodium oxide, or combinations of two or more thereof, sodium hydroxide being preferred.

In addition there is provided, or formed in situ, as a starting material a compound which can combine with the sodium alkali at low temperature, e.g. sodium silicate 3, and as starting materials there may also be provided water 4 and one or more catalytic salts 5, for example sea salt or one or more salt components thereof.

As shown in the single figure in the drawing, the sand 1 is coated with sodium alkali 2 and sodium silicate 3, preferably by mixing the sand with an aqueous solution of the alkali 2 and silicate 3 with or without catalytic salt 5 and drying the same to form particulate masses. Suitable catalytic salts are sodium chloride, sodium bromide, sodium sulfate, magnesium chloride, magnesium bromide, magnesium sulfate, calcium chloride, calcium bromide, calcium sulfate, potassium chloride, potassium bromide, potassium sulfate, and combinations of the foregoing. As indicated at 7 heat may be employed for drying and fixing the sodium alkali and sodium silicate on the sand particles, or if desired a part or all of the sodium silicate may be formed in situ, by preliminarily heating the alkali bearing silica particles at no more than 2400° F. for a period of time prior to subjecting them to the principal reaction 8 at over 3100° F. The heat 7 for effecting the drying, when the alkali is applied from aqueous solution, and for effecting the preliminary heating aforesaid, may at least in part be derived from the effluent gases, if any, from

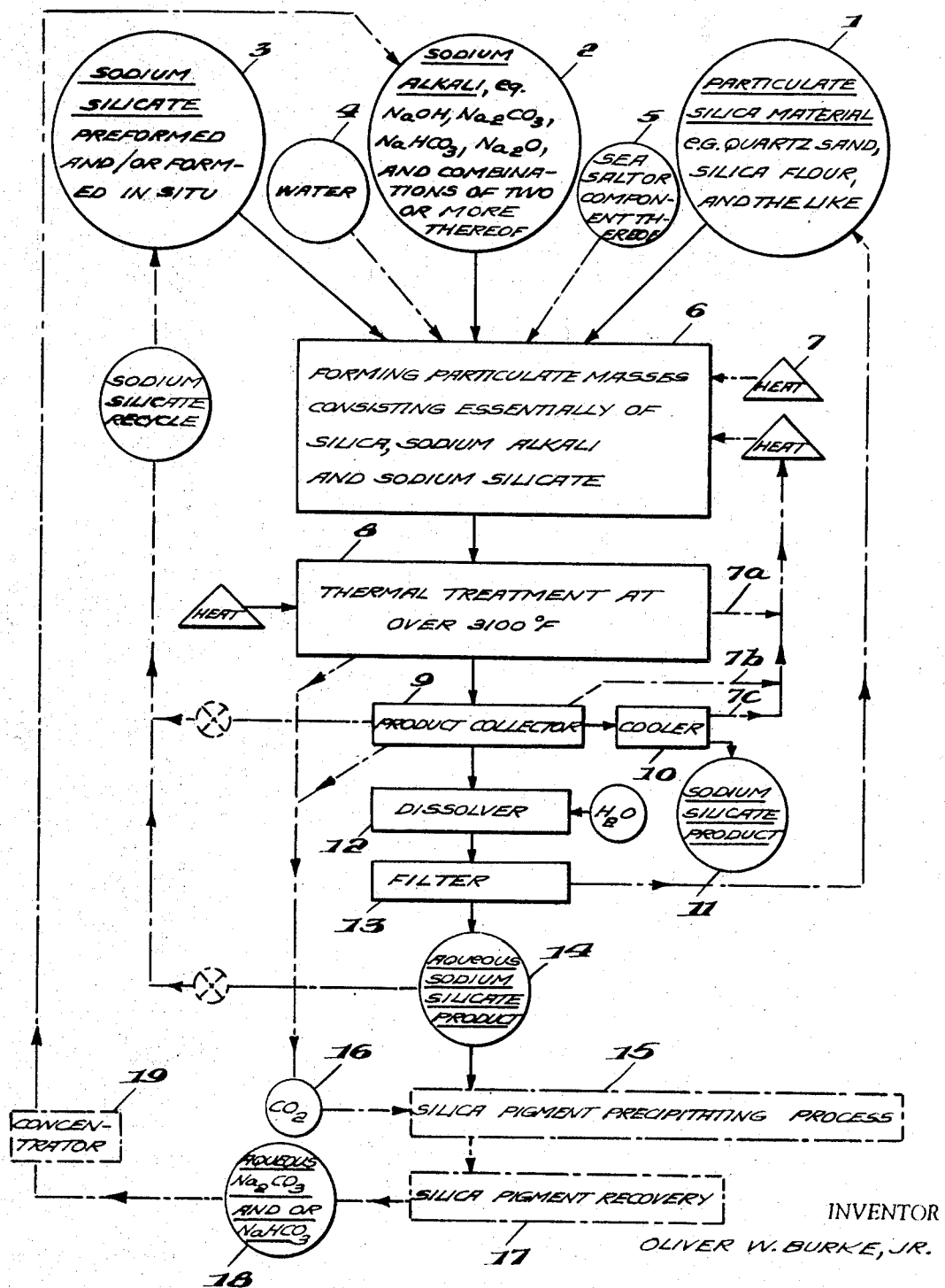

the end of said single pass as $Na_2O(SiO_2)_{2.5-4.0}$. In such embodiments the tubular reactor means may comprise a first heated tubular reactor section wherein the mixture, which preferably contains catalytic salt as above described, is heated to temperatures in the range of 1500 to 2500° F., said single pass being at a rate such that the mole of sodium alkali reacts with from 10 to 60% of the aforesaid molar quantity of silica material during such passage, and a second heated tubular reactor section wherein the so pre-treated mixture is heated to temperatures in the range of 3100 to 3900° F., the single pass through the second reactor section being at a rate such that the remainder of said molar quantity of silica material enters into the reaction and the reaction product is delivered from said second reactor section as $Na_2O(SiO_2)_{2.5-4.0}$.

In this embodiment, the tubular reactor means advantageously may be of carbon protected from oxidation. The mixture may be passed through such a carbon tube in the presence of an atmosphere therein non-reactive with carbon at the temperature thereof, for example an atmosphere containing more than two moles of reactive hydrogen for each mole of reactive oxygen therein, or an atmosphere of nitrogen, and such atmosphere inside the tube (or inside and outside the tube) may be maintained at slightly above atmospheric pressure to prevent ingress of air which would oxidize the incandescent carbon of the heated tube. The tube may be heated electrically or otherwise and/or may itself constitute an electrical conductor heated by the passage of electric current therethrough.

As specific illustration of the practice of the invention by the procedures above described reference may be had to the following examples which are illustrative but not restrictive, of the invention.

EXAMPLE 1

A liquor is prepared by mixing at about 95° C., 1000 grams of commercial 41° Be. sodium silicate of the formula $Na_2O(SiO_2)_{3.33}$ (89 grams $Na_2O$ dry basis) and 1300 grams of 50% by weight aqueous sodium hydroxide solution, to provide a molar ratio of $Na_2O:SiO_2$ of 2:1. To the resulting liquor is added 1630 grams of quartz sand and the mass is then dried by agitating in a steam heated vented jacketed vessel (steam pressure 50 p.s.i.), producing silica particles coated with a composition of the formula $(Na_2O)_2SiO_2$. The proportion of sodium silicate to sand employed in this example, dry basis, was 23 parts per 100.

The coated sand is then converted in particulate form with the aid of a hot air blast through a powder feeder into the vortex of a tangentively fired carbon black furnace of the type illustrated in Krejci U.S. Pat. No. 2,564,700 issued Aug. 21, 1951, adapted for the purposes of this example by removal of the oil feed pipe and jacket, and replacement thereof by the powder feeding apparatus, the furnace being gas fired and operated with preheated combustion air to attain a furnace temperature sufficient to heat the particles to about 3500° F.

The effluent gases and suspended matter are separated in a cycline type separator and the sodium silicate is converted to a 41° Be. aqueous solution by working it with water in a heated ball mill, and the resultant product is filtered.

EXAMPLE 2

A liquor is prepared by mixing at about 95° C. 1000 grams of the same sodium silicate solution used in Example 1, and 1032 grams of the 50% sodium hydroxide solution, to provide a molar ratio of $Na_2O:SiO_2$ of 1.6:1. 1290 grams of quartz sand are added and the mass is dried as in Example 1. The proportion of sodium silicate to sand employed thus was 29 parts per 100.

The coated sand is then fed by a powder feeder into the central part of the upper end of an elongated heated tube, and is conveyed with the aid of gravity through the tube and through a cooling chamber and into a collector at the bottom of the chamber, the tube being electrically heated to raise the temperature of the particles passing therethrough to about 3500° F. The product thus attained is in dry form and may be put into aqueous solution as in Example 1. The process of this example may be practiced by treating the coated sand in an electric furnace at above 3100° F. in bulk, if desired, as illustrated in Example 4.

EXAMPLE 3

A liquor is prepared from 1000 grams of the same sodium silicate solution and 510 grams of the same sodium hydroxide solution, producing a molar ratio therein of $Na_2O$ to $SiO_2$ of 1:1, and 638 grams of sand are added, and the mass is dried under agitation. The resulting coated sand is thermally treated in the same manner as in the preceding examples at temperatures above 3100° F., and the product is recovered as therein set forth.

EXAMPLE 4

Example 1 is repeated there being added to the liquor 40 grams of sea salt. The rate of the reaction is improved, and the sodium silicate product containing the sea salt residues is useful for conversion to siliceous pigment for the reinforcement of rubbers.

EXAMPLE 5

A liquor is prepared by mixing 1000 grams of 41° Be sodium silicate of the formula $Na_2O(SiO_2)_{3.33}$ (89 grams of $Na_2O$, dry basis), and 1530 grams of 50% by weight aqueous sodium hydroxide solution, and after addition of 1630 grams of silica flour one liter of sea water is added while agitating the mixture, and the resulting mixture is dried and preliminarily heated to 1400° F. for one hour, during which time a part of the sodium hydroxide and sand reacts to form sodium silicate in situ, this reaction being facilitated by the presence of the sea salts from the sea water. The partially reacted material, containing the unreacted particulate silica, is placed in an electrically heated crucible and taken to a temperature in excess of 3100° F., and held until the mass is fused. After cooling, the resulting glass is dissolved in water in a steam heated ball mill (steam pressure 60 p.s.i.) to approximately 38% solids, dry basis, and filtered.

While the presently preferred embodiments of the invention employ the types of furnaces 8 above described, principles of the invention may also be applied to enable operation of conventional sodium silicate glass furnaces at temperatures in the range of 3100-3900° F., in which case the charge prepared in accordance with step 6 above is delivered to the glass furnace as a feed stock containing alkali of reduced volatility enabling the temperature of operation of the sodium silicate glass furnace 8 to be increased to the higher range with consequent reduction in the operating time required. This procedure is especially effective when the sodium silicate glass furnace 8 is of the electrically heated type. In such cases the melt will be drawn from the glass furnace 8 to the combined collection and cooling zone 9 10, to deliver the glass 11 in a form suitable for further processing in the conventional manner.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive to the invention, the scope of which is defined in the appended claims, and that all modifications of the claims are intended to be included therein.

What is claimed is:

1. In the production of sodium silicate by the reaction of sodium alkali and silica, the improvement which consists in:
(a) forming a mixture of particulate silica material 100 parts as $SiO_2$; sodium silicate 10 to 60 parts as $Na_2O(SiO_2)_{2.5-4.0}$; and sodium alkali in such proportion as to produce alkali-carrying silica particles in which the molar ratio of the total alkali as $Na_2O$ to the total silica as $SiO_2$ is 1:2.5 to 1:4;
(b) conveying the alkali-carrying silica particles in a gaseous medium through a heating zone heated to above 3100° F., to form further sodium silicate, and
(c) recovering sodium silicate produced in step (b).

2. An improvement as claimed in claim 1, in which in step (b) the particles are conveyed through the heating zone with the aid of gravity.

3. In the introduction of sodium silicate by the reaction of sodium alkali and silica, the improvement which consists in:
(a) forming a mixture of particulate silica materials 100 parts as $SiO_2$; sodium silicate 10 to 60 parts as $Na_2O(SiO_2)_{2.5-4.0}$; and sodium alkali in such proportion as to produce alkali carrying silica particles in which the molar ratio of the total alkali as $Na_2O$ to the total silica is $SiO_2$ is 1:2.5 to 1:4;
(b) conveying the particles prepared by step (a) in a gaseous medium through a refractory lined direct flame furnace heated to a temperature to form further sodium silicate while essentially keeping the particles out of contact with the furnace lining during their passage therethrough, and
(c) recovering sodium silicate produced in step (b).

4. An improvement as claimed in claim 3, wherein the particles are kept out of contact with the furnace lining as aforesaid by a flow of gas.

5. An improvement as claimed in claim 3, wherein the particles are projected into the vortex of a tangentially fired direct flame furnace.

6. An improvement as claimed in claim 3, wherein the mixing step (a) is effected by ball-milling together the sodium silicate, the sodium alkali, and the particulate silica material.

7. An improvement as claimed in claim 3, wherein the mixing of step (a) is effected by applying the sodium silicate and sodium alkali in aqueous solution to the particulate silica material and drying the same.

8. An improvement as claimed in claim 3, wherein in step (c) the recovery is effected by forming an aqueous sodium silicate solution by passing the hot particulate effluent from step (b) into direct contact with water.

9. An improvement as claimed in claim 3, wherein in step (c) the recovery is effected by mixing the particulate effluent from step (b) with water and subjecting the mixture to high shear dispersion.

10. An improvement as claimed in claim 3, wherein part of the sodium silicate recovered in step (c) is recycled to step (a).

11. An improvement as claimed in claim 3, wherein the sodium alkali employed in step (a) is sodium hydroxide.

12. An improvement as claimed in claim 3, wherein in step (a) there is also incorporated into the mixture from 0.05 to 5 parts of catalytic salt selected from the class consisting of sodium chloride, sodium bromide, sodium sulfate, magnesium chloride, magnesium bromide, magnesium sulfate, calcium chloride, calcium bromide, calcium sulfate, potassium chloride, potassium bromide, postassium sulfate, and combinations of the foregoing.

13. An improvement as claimed in claim 12, wherein the added salt is sea salt.

14. An improvement as claimed in claim 3, wherein the mixture prepared by step (a) is preheated to not more than 1500° F. before being subjected to step (b).

15. An improvement as claimed in claim 3, wherein the mixture formed in step (a) is prepared by mixing the silica and the sodium alkali and heating the same at no more than 2400° F. to form some sodium silicate in situ before subjecting the resulting mixture to step (b).

16. An improvement as claimed in claim 12, wherein the mixture formed in step (a) is prepared by mixing the silica, the sodium alkali and the catalyst salt and heating the same at no more than 1500° F. to form sodium silicate in situ before subjecting the resulting mixture in step (b).

17. In the production of sodium silicate by the reaction of sodium alkali and silica, the improvement which consists in:
(a) forming a mixture of particulate silica material 100 parts as $SiO_2$; sodium silicate 10 to 60 parts as $Na_2O(SiO_2)_{2.5-4.0}$; and sodium alkali in such proportion as to produce alkali-carrying silica particles in which the molar ratio of the total alkali as $Na_2O$ to the total silica as $SiO_2$ is 1:2.5 to 1:4;
(b) conveying the particles prepared by step (a) in a gaseous medium through a tubular furnace heated to a temperature to form further sodium silicate and lined with refractory containing on its surface oxide of metal selected from Groups IIIB and IVB of the Periodic Table including the rare earth metals, for augmenting the radiant heat component of heat transfer to the particles, while essentially keeping the particles out of contact with the said furnace lining during their passage therethrough, and
(c) recovering sodium silicate produced in step (b).

18. In the production of sodium silicate by thermally reacting sodium alkali and silica, and recovering the sodium silicate formed, the improvement which consists in:
(a) forming a mixture of particulate silica material 100 parts; sodium silicate 10 to 60 parts as $Na_2O(SiO_2)_{2.5-4.0}$; and sodium alkali in such proportion as to produce alkali-carrying silica particles in which the molar ratio of the total $Na_2O$ to the total $SiO_2$ is 1:2.5 to 1:4, wherein the sodium silicate on the particles depresses the volatility of the sodium alkali, and
(b) converting the silica of the mixture substantially entirely to sodium silicate by heating the mixture to temperatures in the range of 3100 to 3900° F.

19. In the production of sodium silicate by thermally reacting sodium alkali and silica and recovering the sodium silicate formed, the improvement which consists in effecting the reaction in two steps, namely:
(a) preheating a mixture of particulate silica material and sodium alkali in such proportion as to produce alkali-carrying silica particles in which the molar ratio of the total $Na_2O$ to the total $SiO_2$ is 1:2.5 to 1:4 to temperatures between 1500 and 2200° F. to form in situ sodium silicate in the amount of 10 to 60 parts as $Na_2O(SiO_2)_{2.5-4.0}$ per 100 parts of silica material, and
(b) then converting the remainder of the silica substantially entirely to sodium silicate by heating the same to temperatures in the range of 310 to 3900° F.

20. A process for the continuous production of sodium silicate which comprises:
(a) preparing a mixture of particulate silica material and sodium alkali comprising one mole of sodium alkali as $Na_2O$ to 2.5 to 4.0 moles of silica as $SiO_2$,
(b) passing said mixture in a single pass through a first heated tubular reactor section and heating the mixture therein to temperatures in the range of 1500 to 2200° F., said single pass being at a rate such that the mole of sodium alkali reacts with from 10 to 60% of the aforesaid molar quantity of silica material during such passage, and then
(c) passing the partially reacted mixture from said first tubular reactor section through a second tubular reaction section in a single pass and heating the same therein to temperatures in the range of 3100 to 3900° F., said single pass through said second reactor section being at a rate such that the remainder of said molar quantity of silica material enters into the reaction and the reaction product is delivered from said second reactor section as $$Na_2O(SiO_2)_{2.5-4.0}$$

21. A process for the production of sodium silicate which comprises:
   (a) preparing a mixture of particulate silica material and sodium alkali comprising one mole of sodium alkali as $Na_2O$ to 2.5 to 4.0 moles of silica as $SiO_2$, and
   (b) progressively advancing said mixture in a single pass through closed heated tubular reactor means, while heating the mixture to temperatures between 1500 and 3900° F., at a rate such that the reaction product is delivered at the end of said single pass as $Na_2O(SiO_2)_{2.5-4.0}$.

22. A process as defined in claim 21, wherein the reaction is conducted in tubular reactor means of carbon which is protected from oxidation.

23. A process as defined in claim 22, wherein the mixture is passed through the reactor means in the presence of an atmosphere therein non-reactive with carbon at the temperatures thereof, and maintained at slightly above atmospheric pressure.

24. A process as claimed in claim 21, wherein in step (a) there is also incorporated into the mixture from 0.05 to 5 parts of a catalytic salt selected from the class consisting of sodium chloride, sodium bromide, sodium sulfate, magnesium chloride, magnesium bromide, magnesium sulfate, calcium chloride, calcium bromide, calcium sulfate, potassium chloride, potassium bromide, potassium sulfate, and combinations of the foregoing.

References Cited

UNITED STATES PATENTS

| | | | |
|---|---|---|---|
| 2,823,097 | 2/1958 | Mockrin | 23—110 |
| 2,950,570 | 8/1960 | Cowles | 23—110 |

OTHER REFERENCES

"Chemistry of the Soluble Silicates," article by Reynold C. Merrill, pp. 262 and 265. Journal of Chemical Education, vol. 24, No. 6, June 1947.

EDWARD STERN, Primary Examiner